United States Patent
Hutchins et al.

(10) Patent No.: US 10,418,048 B1
(45) Date of Patent: Sep. 17, 2019

(54) NOISE REFERENCE ESTIMATION FOR NOISE REDUCTION

(71) Applicant: Cirrus Logic International Semiconductor Ltd., Edinburgh (GB)

(72) Inventors: Benjamin Hutchins, Cremorne (AU); Brenton Robert Steele, Cremorne (AU)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 15/966,748

(22) Filed: Apr. 30, 2018

(51) Int. Cl.
| G10L 21/00 | (2013.01) |
| G10L 21/0216 | (2013.01) |
| H04R 1/10 | (2006.01) |
| H04M 1/02 | (2006.01) |

(52) U.S. Cl.
CPC ....... G10L 21/0216 (2013.01); H04M 1/0258 (2013.01); H04R 1/105 (2013.01); H04R 1/1083 (2013.01); *G10L 2021/02165* (2013.01)

(58) Field of Classification Search
CPC .................................................. G10L 21/00
USPC .......... 704/226, 233, 206; 381/71.1, 66, 379
See application file for complete search history.

(56) References Cited

U.S. PATENT DOCUMENTS

| 9,607,603 B1* | 3/2017 | Ebenezer | H04R 1/1083 |
| 2005/0149320 A1* | 7/2005 | Kajala | G10L 21/0208 704/206 |
| 2007/0055505 A1* | 3/2007 | Doclo | G10L 21/0208 704/226 |
| 2007/0076898 A1* | 4/2007 | Sarroukh | G10K 11/341 381/92 |
| 2007/0273585 A1* | 11/2007 | Sarroukh | G10K 11/341 342/379 |
| 2008/0159559 A1* | 7/2008 | Akagi | G10L 21/0208 381/92 |
| 2010/0004929 A1* | 1/2010 | Baik | G10L 21/0208 704/233 |
| 2010/0246851 A1* | 9/2010 | Buck | G10L 21/0208 381/94.1 |
| 2012/0093333 A1* | 4/2012 | Hu | H04R 1/406 381/71.7 |
| 2012/0123772 A1* | 5/2012 | Thyssen | G10L 21/0208 704/226 |

(Continued)

*Primary Examiner* — Michael C Colucci
(74) *Attorney, Agent, or Firm* — Jackson Walker L.L.P.

(57) ABSTRACT

A device for noise estimation comprises a first microphone capturing a nominal speech signal, and a second microphone capturing a nominal noise signal. A generalized sidelobe canceller of the device applies spatial noise reduction, and comprises a blocking matrix filter to adaptively process the nominal speech signal to produce a speech cancellation signal, a node for subtracting the speech cancellation signal from the nominal noise signal to produce a noise reference signal, a noise cancellation filter to adaptively filter the noise reference signal to produce a noise cancellation signal; and a node for subtracting the noise cancellation signal from the nominal speech signal to produce a speech reference signal. An adaptive noise estimation module of the device comprises a node for subtracting the noise reference signal from the speech reference signal and outputting a difference signal; a smoothing filter for filtering the difference signal to produce a long term difference signal; and a node for adding the long term difference signal to the noise reference signal to produce an enhanced noise reference signal.

22 Claims, 4 Drawing Sheets

(56) References Cited

U.S. PATENT DOCUMENTS

| | | | |
|---|---|---|---|
| 2012/0185246 A1* | 7/2012 | Zhang | G10L 21/0208 |
| | | | 704/226 |
| 2014/0056435 A1* | 2/2014 | Kjems | G10L 21/0232 |
| | | | 381/66 |
| 2016/0029121 A1* | 1/2016 | Nesta | G10L 19/008 |
| | | | 381/71.1 |
| 2017/0309294 A1* | 10/2017 | Gannot | G10L 21/0232 |
| 2018/0294000 A1* | 10/2018 | Steele | H04R 3/005 |

* cited by examiner

Fig. 8

NOISE REFERENCE ESTIMATION FOR NOISE REDUCTION

FIELD OF THE INVENTION

The present invention relates to the digital processing of signals from microphones or other such transducers, and in particular relates to a device and method for estimating the amount of noise in such signals to assist noise reduction or the like.

BACKGROUND OF THE INVENTION

Modern headset communication devices are increasingly expected to work well in significant levels of ambient noise. This typically includes both temporally and spatially non-stationary noise sources, such as moving traffic and office babble. This presents a major challenge to the signal processing system, specifically Voice Activity Detection (VAD) and Noise Reduction (NR) systems, and their underlying algorithms.

The task of removing unwanted noise from the desired signal (the desired signal being the user's speech) is referred to as Noise Reduction (NR). The efficacy of any NR algorithm is dependent on its ability to isolate the desired speech signal from the unwanted environmental noise. As such, the system's ability to accurately model or estimate the noise component being removed is crucial.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

In this specification, a statement that an element may be "at least one of" a list of options is to be understood that the element may be any one of the listed options, or may be any combination of two or more of the listed options.

SUMMARY OF THE INVENTION

A device for noise estimation, the device comprising:
a first microphone for capturing a nominal speech signal;
a second microphone for capturing a nominal noise signal;
a generalised sidelobe canceller for spatial noise reduction, comprising:
  a blocking matrix filter configured to adaptively process the nominal speech signal to produce a speech cancellation signal;
  a first subtraction node for subtracting the speech cancellation signal from the nominal noise signal to produce a noise reference signal;
  a noise cancellation filter configured to adaptively filter the noise reference signal to produce a noise cancellation signal; and
  a second subtraction node for subtracting the noise cancellation signal from the nominal speech signal to produce a speech reference signal; and
an adaptive noise estimation module comprising:
  a third subtraction node for subtracting the noise reference signal from the speech reference signal and outputting a difference signal;
  a smoothing filter for filtering the difference signal to produce a long term difference signal; and
  a summation node for adding the long term difference signal to the noise reference signal to produce an enhanced noise reference signal.

A non-transitory computer readable medium comprising computer program code means to make a computer execute a procedure for noise estimation, the computer program product comprising:
computer program code means for obtaining a nominal speech signal from a first microphone;
computer program code means for obtaining a nominal noise signal from a second microphone;
computer program code means for applying spatial noise reduction with a generalised sidelobe canceller, by:
  adaptively processing the nominal speech signal with a blocking matrix filter to produce a speech cancellation signal;
  subtracting the speech cancellation signal from the nominal noise signal to produce a noise reference signal;
  adaptively filtering the noise reference signal with a noise cancellation filter to produce a noise cancellation signal; and
  subtracting the noise cancellation signal from the nominal speech signal to produce a speech reference signal; and
computer program code means for adaptively estimating noise by:
  subtracting the noise reference signal from the speech reference signal and outputting a difference signal;
  filtering the difference signal with a smoothing filter to produce a long term difference signal; and
  adding the long term difference signal to the noise reference signal to produce an enhanced noise reference signal.

A method for noise estimation, the method comprising:
obtaining a nominal speech signal from a first microphone;
obtaining a nominal noise signal from a second microphone;
applying spatial noise reduction with a generalised sidelobe canceller, by:
  adaptively processing the nominal speech signal with a blocking matrix filter to produce a speech cancellation signal;
  subtracting the speech cancellation signal from the nominal noise signal to produce a noise reference signal;
  adaptively filtering the noise reference signal with a noise cancellation filter to produce a noise cancellation signal; and
  subtracting the noise cancellation signal from the nominal speech signal to produce a speech reference signal; and
adaptively estimating noise by:
  subtracting the noise reference signal from the speech reference signal and outputting a difference signal;
  filtering the difference signal with a smoothing filter to produce a long term difference signal; and
  adding the long term difference signal to the noise reference signal to produce an enhanced noise reference signal.

In some embodiments of the invention, a time constant of the smoothing filter is greater than a length of the noise cancellation filter. For example, the noise cancellation filter may have a length in the range of 4-8 ms, and the time constant of the smoothing filter may be greater than 8 ms.

In some embodiments of the invention, Fast Fourier Transform blocks are provided to convert the noise reference signal and the speech reference signal to the frequency domain prior to the third subtraction node. The noise reference signal and the speech reference signal may further be converted to the log dB domain prior to the third subtraction node.

In some embodiments of the invention, the smoothing filter is configured to filter the difference signal temporally. Additionally or alternatively, the smoothing filter may be configured to filter the difference signal spectrally across adjacent frequency bands.

In some embodiments of the invention, the smoothing filter is gated by a voice activity detector so as to update the long term difference signal only when speech is not detected.

Some embodiments of the invention further provide a third microphone, wherein a second noise reference signal is produced by the GSC, and wherein the noise reference signals are combined to obtain a combined noise reference signal used to produce the difference signal. In such embodiments, the combining may comprise selecting the maximum absolute real and imaginary FFT components per subband.

In some embodiments of the invention, the device may comprise at least one of a telephony headset or handset, a still camera, a video camera, a tablet computer, a cochlear implant or a hearing aid.

BRIEF DESCRIPTION OF THE DRAWINGS

An example of the invention will now be described with reference to the accompanying drawings, in which.

Corresponding reference characters indicate corresponding components throughout the drawings.

DETAILED DESCRIPTION OF PREFERRED EMBODIMENTS

Figure 1A:
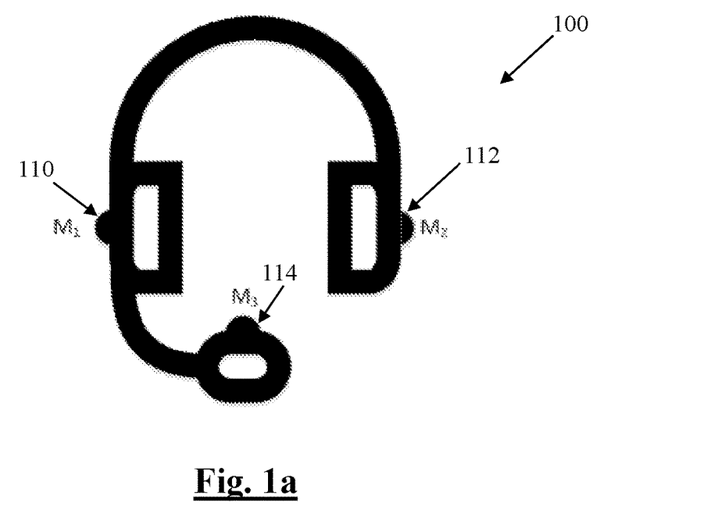
FIGS. 1a and 1b depict a headset for deploying noise reduction in accordance with one embodiment of the invention.

FIG. 1a shows a 3-microphone headset 100 which deploys a noise reduction (NR) module in accordance with one embodiment of the invention. Other devices which may implement NR in accordance with other embodiments of the invention include headsets whether wired or wireless, smartphones, tablet computers, digital cameras, and audio capture devices. In the embodiment of FIG. 1 the headset 100 has three microphones, namely microphone 110 or $M_1$ on the exterior of a right earcup of the headset 100, microphone 111 or $M_2$ on the exterior of a left earcup of the headset 100, and microphone 114 or $M_3$ on a boom of the headset 100. Other embodiments may provide for NR to be applied to devices having an alternative number of microphones, including devices having two or more microphones. Each microphone, $M_1$, $M_2$, and $M_3$ captures a respective acoustic signal and transforms it to a corresponding electrical signal. The microphone signals could be used for telephony, voice recordings, or the like. Alternative embodiments may take other form factors, such as a headset having earcups without a boom, a single earpiece with a boom, earbuds with a wired pendant, wireless earbuds, and the like.

Figure 1B:
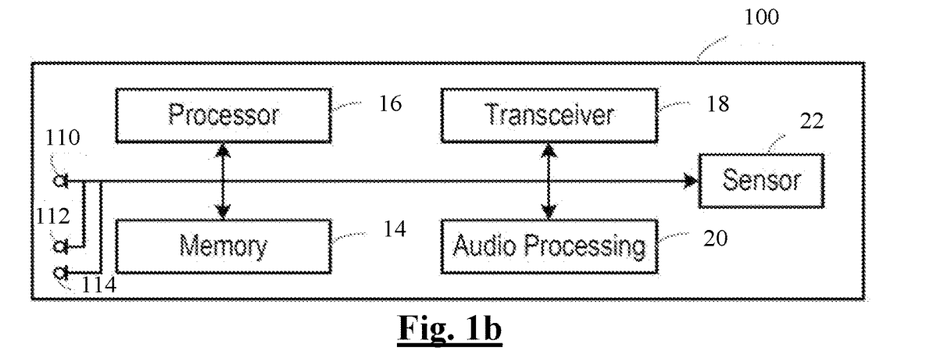

FIG. 1b is a schematic diagram, illustrating the form of the headset 100. Specifically, FIG. 1b shows various interconnected components of the headset 100. It will be appreciated that the headset 100 may in practice contain many other components, but the following description is sufficient for an understanding of the present invention. Thus, FIG. 1b shows the microphones 110, 112, 114.

FIG. 1b also shows a memory 14, which may in practice be provided as a single component or as multiple components. The memory 14 is provided for storing data and program instructions. FIG. 1b also shows a processor 16, which again may in practice be provided as a single component or as multiple components. For example, one component of the processor 16 may be an applications processor of the headset 100.

FIG. 1b also shows a transceiver 18, which is provided for allowing the headset 100 to communicate with external devices such as a smartphone. For example, the transceiver 18 may include circuitry for establishing a Bluetooth connection. FIG. 1b also shows audio processing circuitry 20, for performing operations on the audio signals detected by the microphones.

When addressing the problem of noise reduction (NR) in using headset 100 for telephony or voice capture, one approach has been to estimate the noise component from a single audio signal, i.e. the very signal from which the noise is to be removed. When the user is not speaking, this signal is a "perfect" noise estimate, making the task of NR straightforward. In the presence of any desired speech, however, this signal is a very poor representation of the noise component. Consequently, one approach is to employ slow time constants for noise estimation, and to rely on fast-acting voice activity detection (VAD) to gate or suspend noise estimation whenever the VAD determines that speech is present.

The success of this approach is highly dependent on the accuracy of the VAD system. Any failure in the voice activity detection leads to inaccuracies in noise estimation, and one approach to accommodating such inaccuracies is to employ slow time constants to minimize degradation in the noise estimate resulting from inaccurate VAD. A consequence of the use of such slow time constants however is that the NR system can be quite ineffective in the presence of non-stationary noise, and fails to significantly reduce non-stationary noise. Furthermore, at times when the level of unwanted noise increases and the SNR degrades, the VAD becomes increasingly unreliable and in particular the VAD produces a greater rate of false-negative detection outputs, falsely indicating an absence of speech when in fact the user is speaking in a noisy environment. Increased rates of false-negative VAD outputs result in very "choppy", or widely and rapidly varying, noise reduction, as the noise estimation system spends increasing time adapting to speech instead of only to noise. NR is therefore highly susceptible to poor performance in loud stationary noise, and also in most non-stationary noise conditions.

Based on such insights the present invention seeks to provide improved noise estimation, in order to improve noise reduction. While our aim (to achieve a perfect noise estimate, devoid of speech) may not be practically possible, we can go some way by appropriate use of the multi-microphone information already within the DSP signal chain.

Figure 2:
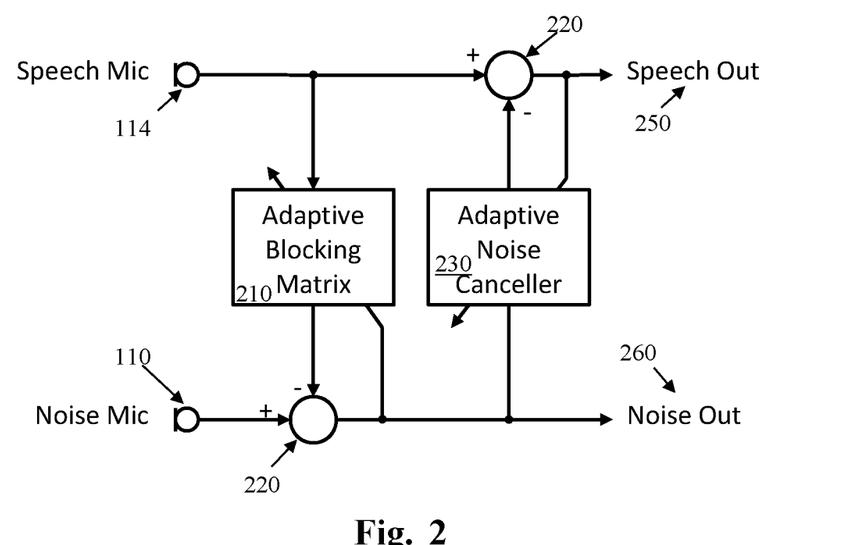
FIG. 2 illustrates a portion of a headset transmit signal path.

FIG. 2 illustrates a portion of a headset transmit (Tx) signal path. The signal path comprises inputs from microphones 110 and 114 of headset 100, feeding into an adaptive beamformer or null-steerer in the form of a generalised sidelobe canceller (GSC). In this embodiment the GSC has two microphone inputs 110 and 114, and two processed outputs comprising a speech reference signal 250 and a noise reference signal 260. On the input side, the "Speech Mic" 114 is located closest to the mouth as shown in FIG. 1a, while the "Noise Mic" 110 is located furthest from the mouth. There can be significant variation on microphone placements, depending on the headset design. As the goal of this embodiment is to separate the wanted speech from the unwanted noise, ideally the "Noise Mic" signal 110 carries significantly less speech than the "Speech Mic" signal 114. On this basis, the Adaptive Blocking Matrix (ABM) filter 210 and subtraction node 220 is then able to remove most of the speech signal from the Noise Mic input 110, producing a "Noise Out" noise reference signal 260 that closely represents the noise signal present at the Noise Mic, with some spectral colouration and a reduction in speech content. This improved noise signal also serves as the noise reference input to the "Adaptive Noise Canceller" filter stage 230, which when passed to subtraction node 240 operates to minimize the level of correlated noise in the Speech Mic signal 114. The resulting "Speech Out" speech reference signal 250 is then an improved speech signal, however the speech reference signal 250 still contains a considerable noise component, due to the imperfect noise correlation between the two microphones.

The speech reference signal 250 is then used as the primary speech input to a noise reduction system (not shown), to undergo noise reduction. However, in accordance with the focus of the present invention on improved noise estimation, we turn to discuss the noise reference signal 260. The present invention recognises that the noise reference signal 260 is of particular interest in regards to noise estimation. Notably, the noise reference signal 260 will have a significantly higher "noise-to-speech" ratio, as the ABM filter 210 is trained to the user's voice and will have cancelled a reasonable proportion of the target speech signal from the Noise Mic input 110, leaving the noise reference signal 260 containing primarily far-field noise, albeit with some spectral colouration. Moreover, because the GSC is being implemented in any event in order to produce the speech reference signal 250, there are computational efficiencies in simply copying and reusing intermediate signals which are already being produced by the GSC, in particular the noise reference signal 260.

The present embodiment thus recognises that for the purpose of residual noise reduction, in the simple 2-Mic case of FIG. 2, we now have a potentially useful noise reference signal 260 to work with, namely noise reference signal 260. A remaining challenge nevertheless remains, which is to compensate for any spectral differences between the noise reference signal 260 on one hand, and the actual noise component present on the GSC speech reference signal 250 on the other hand.

Figure 3:
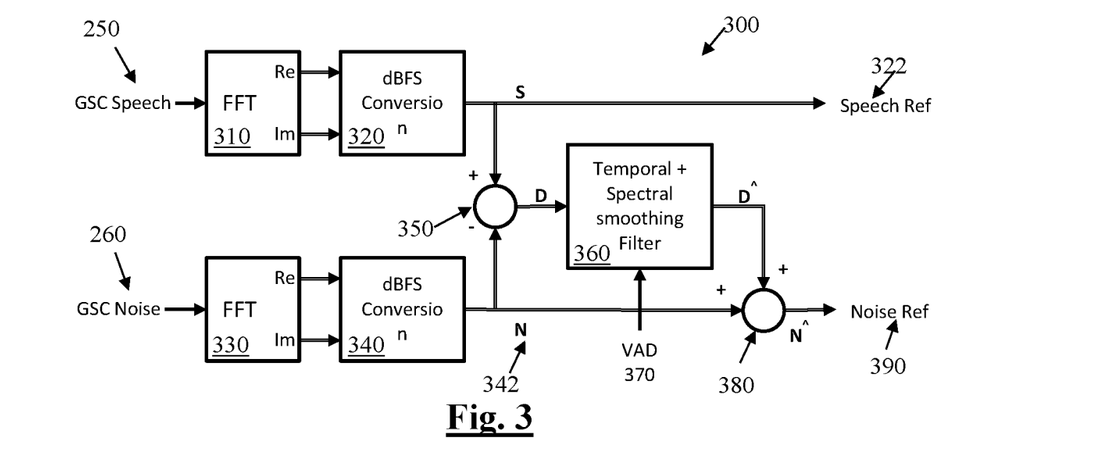
FIG. 3 illustrates the adaptive noise estimation system of one embodiment of this invention.

FIG. 3 gives an overview of the adaptive noise estimation system 300 of the present embodiment. To provide for adaptive noise reference estimation, we recall that our intended goal is to effect residual noise reduction. In speech communication this is commonly performed in the frequency domain, a process referred to as spectral subtraction. Signal processing is performed in the frequency domain, via FFT filterbank analysis and synthesis. In this embodiment this is effected by windowed short-term Fast Fourier Transform (typically into 128 or 256 bands at 16 kHz). We apply such transformation to both the Speech reference signal 250 and the noise reference signal 260 output from the GSC of FIG. 2, using FFT blocks 310 and 330, respectively. FFT blocks 310 and 330 produce two separate subband vectors. Further conversion of the complex FFT outputs by respective dBFS Conversion blocks 320 and 340 then yields subband dBFS level vectors S and N, as all further downstream processing is performed in the log (dB) domain.

Notably, the present invention recognises that because the GSC adaptive filters 210 and 230 are quite small in size (4-8 ms), the GSC noise reference signal 260 is only uncorrelated to the GSC Speech output 250 in the short term sense, as defined by these small filters. In the long-term sense however (>8 ms), there still remains a reasonable correlation due to the time constant of the room transient response. This correlation is what we are attempting to exploit in this algorithm. The existence of any such long term sense correlation is surprising due to the effect of the GSC in decorrelating the signals. However the present invention recognises that non-stationary noise typically has time constants in the tens or hundreds of milliseconds and that the decorrelation effect of the GSC typically takes effect at time constants less than around ten milliseconds, so that the present inventors now recognise that the remaining long-term (>8 ms) correlation in the GSC outputs in fact presents an opportunity to address non-stationary noise.

To capture this, a temporal and spectral smoothing filter 360 is provided so that the instantaneous subband level difference (D, where D=S−N) produced by subtraction node 350 is filtered in both time (Temporal) and across adjacent frequency bands (spectral), to produce long-term subband difference vector (D^). Importantly, this process of filter 360 is gated by the binary VAD input 370, ensuring that the estimation D^ only updates when there is no speech present.

The long-term subband difference vector (D^) output by filter 360 is then used as a Noise Correction vector and is added to the instantaneous Noise vector (N) derived from the noise reference signal 260, by way of summing node 380. Summing node 380 thereby yields an improved "Noise Reference" output vector (N^) 390. This modified Noise estimate 390 more closely matches the noise subband levels present on the Speech Reference (S), but with significantly less "speech" content, thus providing an improved noise estimation.

Figure 4A:
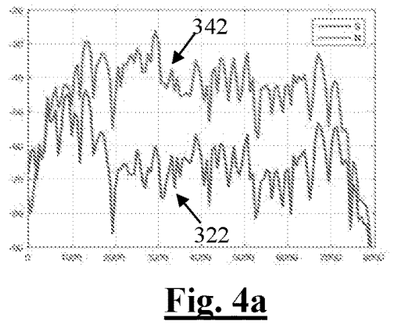
FIGS. 4a and 4b are plots of typical STFT spectra for speech reference and noise reference signals in the embodiments of FIG. 3.
Figure 4B:
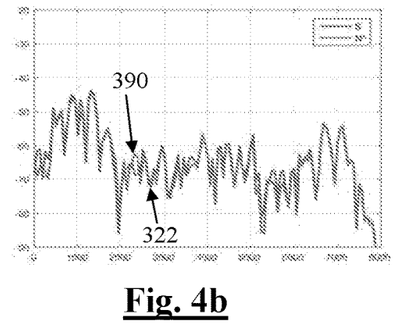

FIGS. 4a and 4b are plots of typical STFT spectra for each of the signals in question. In particular, FIG. 4a shows a typical analysis of the speech reference signal 250 and the (unimproved) noise reference signal 260, in the presence of far-field diffuse noise. The difference, as noted earlier, is a combination of noise level difference at each microphone, compounded by the filtering effect of the GSC Blocking Matrix 210. The difference is large enough that N 260 would be a very poor estimate of the noise on S 250. But in FIG. 4b, once the filtered difference (long-term average D^) is applied back to N 260, the new noise estimate 390 (N^) now more closely matches the instantaneous spectrum of the speech reference.

Figure 5:
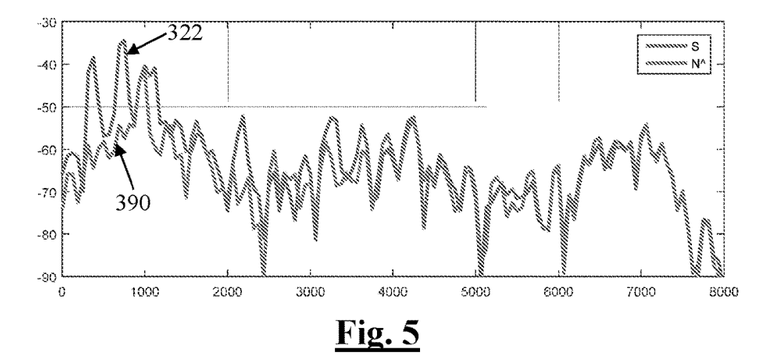
FIG. 5 is a plot of typical STFT spectra for speech reference and noise reference signals in the embodiments of FIG. 3, captured with voiced speech in the presence of high noise.

It is of course to be noted that in the presence of speech, the noise correction vector output by smoothing filter 360 is frozen, and S 322 will deviate from N^ 390 in the frequency bands where speech is present. This is largely the result of speech cancellation due to the GSC Blocking Matrix 210. To illustrate this effect, FIG. 5 is a plot of typical STFT spectra for speech reference and noise reference signals in the embodiments of FIG. 3, but captured with voiced speech in the presence of high noise.

Under ideal conditions, where the noise is spatially and temporally stationary, and the Blocking Matrix filters 210, 230 are well adapted and time-invariant, the noise reference algorithm above shows significant NR performance improvement over the incumbent noise estimation method, most notably in non-stationary noise.

Figure 6:
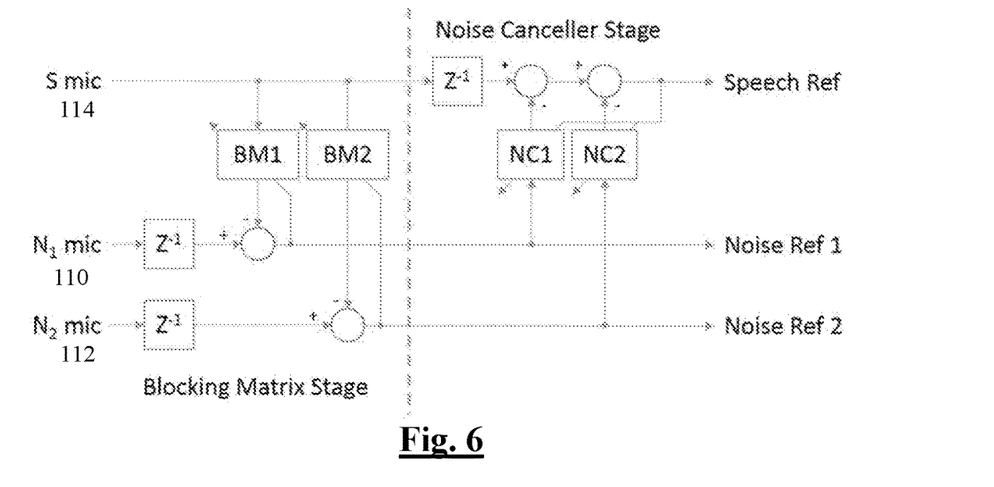
FIG. 6 illustrates a portion of a headset transmit signal path in another embodiment comprising three microphones.

In other embodiments, the present invention may similarly be applied to a three microphone system, such as a system comprising one noise reference microphone 114 and two noise reference microphones 110, 112. FIG. 6 illustrates such an embodiment. The headset DSP Tx input stage comprises a Generalised Sidelobe Canceller (GSC) adaptive front-end. This has numerous possible configurations, depending on the number of mics and their relative positions with respect to the speech source (wearer's mouth). In the system of FIG. 6, for example, the GSC combines three mics to form two noise references via Blocking Matrix filters BM1 and BM2. These noise references serve as inputs to the next Noise Canceller stage.

Filters NC1 and NC2 are adapted in such a way as to minimize noise on the speech mic signal, improving SNR. While this Speech Ref output is of primary interest as our speech signal going forward, (ie speech input to the noise reduction system), the internal Noise reference signals also yield some useful information. Importantly, these signals show a significantly higher noise-to-speech ratio, as the adaptive blocking matrix filters are trained to the user's voice, cancelling a significant proportion of speech, leaving mostly far-field noise, albeit with some spectral colouration.

For the purpose of residual noise reduction, the embodiment of FIG. 6 provides two potentially useful noise reference signals. More generically we can have any number of Noise reference signals output from the GSC, which raises the question of how to combine multiple noise reference outputs from the GSC into one useful noise reference for NR, and further raises the question of how to compensate for spectral differences between the combined noise reference and the speech output from the GSC.

Figure 7:
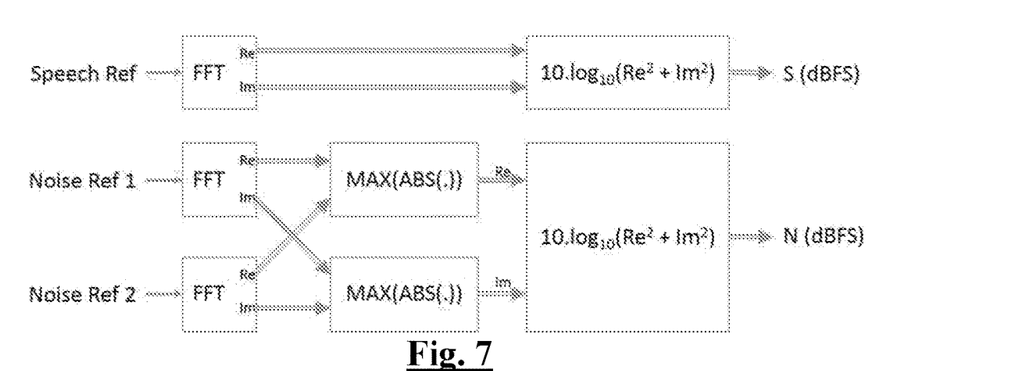
FIG. 7 illustrates the combining of two noise reference signals in the embodiment of FIG. 6.

Currently, spectral analysis of the GSC speech and noise outputs is performed via STFT (FFT). With multiple noise reference signals, the complex FFT data is combined, as shown in FIG. 7, by selecting the maximum absolute real and imaginary components per subband, followed by conversion to dBFS. While this method loses phase information, we only require dB magnitude data for the purpose of residual noise reduction. By combining the noise ref signals in this manner, we achieve a maximum estimate of the noise in each and every subband, with a worst-case over-estimate of 3 dB. We now have both a subband dB speech estimate (S), and a single noise estimate (N, FIG. 7) which is coloured relative to S.

Figure 8:
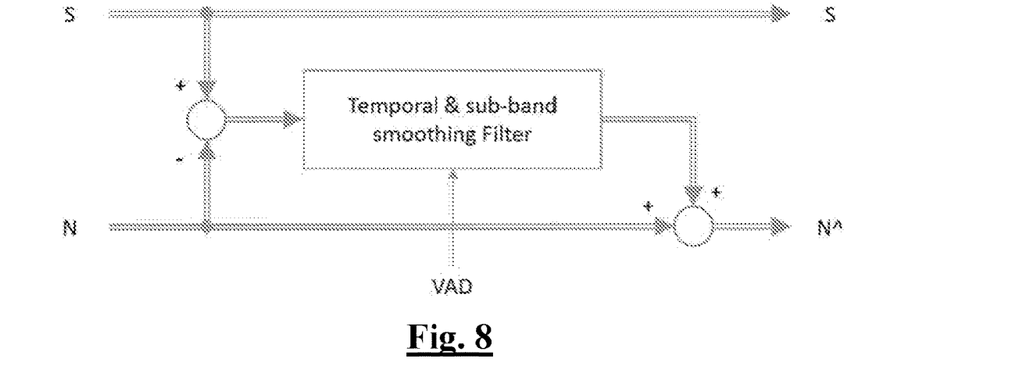
FIG. 8 illustrates the improved noise estimation stage in the embodiment of FIGS. 6 & 7.

Accordingly, we turn to spectral level difference compensation. Due to the effect of the Blocking Matrix filters BM1 and BM2 (FIG. 6), and having non-linearly combined multiple noise references (FIG. 7), we find that the subband noise-ref estimate N is non-identical to the speech estimate S during noise-only conditions. What we require, for the purpose of noise reduction, is a better estimate of the noise component of S. To do so, we must compensate N for the average difference between S & N, obtained during noise-only conditions, as shown in FIG. 8. A VAD must therefore be used to gate the estimation filter process, so that it is only updated when there is little or no speech present. This filtered sub-band level difference is then applied to N, yielding a modified Noise estimate (N^).

Alternative embodiments may be applied to headsets taking other form factors. For example other embodiments may be applied to a neckband headset, and in such embodiments the noise reduction may need to be de-emphasised as it has been noted that this difficult form factor can lead the algorithm to inappropriately reduce speech as well as noise.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A device for noise estimation, the device comprising:
a first microphone for capturing a nominal speech signal;
a second microphone for capturing a nominal noise signal;
a generalised sidelobe canceller for spatial noise reduction, comprising:
a blocking matrix filter configured to adaptively process the nominal speech signal to produce a speech cancellation signal;
a first subtraction node for subtracting the speech cancellation signal from the nominal noise signal to produce a noise reference signal;
a noise cancellation filter configured to adaptively filter the noise reference signal to produce a noise cancellation signal; and
a second subtraction node for subtracting the noise cancellation signal from the nominal speech signal to produce a speech reference signal; and
an adaptive noise estimation module comprising:
a third subtraction node for subtracting the noise reference signal from the speech reference signal and outputting a difference signal;
a smoothing filter for filtering the difference signal to produce a long term difference signal; and
a summation node for adding the long term difference signal to the noise reference signal to produce an enhanced noise reference signal.

2. The device of claim 1, wherein a time constant of the smoothing filter is greater than a length of the noise cancellation filter.

3. The device of claim 2 wherein the noise cancellation filter has a length in the range of 4-8 ms, and the time constant of the smoothing filter is greater than 8 ms.

4. The device of claim 1 further comprising Fast Fourier Transform blocks configured to convert the noise reference signal and the speech reference signal to the frequency domain prior to the third subtraction node.

5. The device of claim 4 wherein the noise reference signal and the speech reference signal are converted to the log dB domain prior to the third subtraction node.

6. The device of claim 1 wherein the smoothing filter is configured to filter the difference signal temporally.

7. The device of claim 1 wherein the smoothing filter is configured to filter the difference signal spectrally across adjacent frequency bands.

8. The device of claim 1 wherein the smoothing filter is gated by a voice activity detector so as to update the long term difference signal only when speech is not detected.

9. The device of claim 1 further comprising a third microphone, wherein a second noise reference signal is produced by the GSC, and wherein the noise reference signals are combined to obtain a combined noise reference signal used to produce the difference signal.

10. The device of claim 9 wherein the combining comprises selecting the maximum absolute real and imaginary FFT components per subband.

11. The device of claim 1, comprising at least one of a telephony headset or handset, a still camera, a video camera, a tablet computer, a cochlear implant or a hearing aid.

12. A non-transitory computer readable medium comprising computer program code means to make a computer execute a procedure for noise estimation, the computer program product comprising:
   computer program code means for obtaining a nominal speech signal from a first microphone;
   computer program code means for obtaining a nominal noise signal from a second microphone;
   computer program code means for applying spatial noise reduction with a generalised sidelobe canceller, by:
      adaptively processing the nominal speech signal with a blocking matrix filter to produce a speech cancellation signal;
      subtracting the speech cancellation signal from the nominal noise signal to produce a noise reference signal;
      adaptively filtering the noise reference signal with a noise cancellation filter to produce a noise cancellation signal; and
      subtracting the noise cancellation signal from the nominal speech signal to produce a speech reference signal; and
   computer program code means for adaptively estimating noise by:
      subtracting the noise reference signal from the speech reference signal and outputting a difference signal;
      filtering the difference signal with a smoothing filter to produce a long term difference signal; and
      adding the long term difference signal to the noise reference signal to produce an enhanced noise reference signal.

13. A method for noise estimation, the method comprising:
   obtaining a nominal speech signal from a first microphone;
   obtaining a nominal noise signal from a second microphone;
   applying spatial noise reduction with a generalised sidelobe canceller, by:
      adaptively processing the nominal speech signal with a blocking matrix filter to produce a speech cancellation signal;
      subtracting the speech cancellation signal from the nominal noise signal to produce a noise reference signal;
      adaptively filtering the noise reference signal with a noise cancellation filter to produce a noise cancellation signal; and
      subtracting the noise cancellation signal from the nominal speech signal to produce a speech reference signal; and
   adaptively estimating noise by:
      subtracting the noise reference signal from the speech reference signal and outputting a difference signal;
      filtering the difference signal with a smoothing filter to produce a long term difference signal; and
      adding the long term difference signal to the noise reference signal to produce an enhanced noise reference signal.

14. The method of claim 13, wherein a time constant of the smoothing filter is greater than a length of the noise cancellation filter.

15. The method of claim 14 wherein the noise cancellation filter has a length in the range of 4-8 ms, and the time constant of the smoothing filter is greater than 8 ms.

16. The method of claim 13 further comprising converting the noise reference signal and the speech reference signal to the frequency domain prior to the third subtraction node.

17. The method of claim 16 wherein the noise reference signal and the speech reference signal are converted to the log dB domain prior to the third subtraction node.

18. The method of claim 13 wherein the smoothing filter filters the difference signal temporally.

19. The method of claim 13 wherein the smoothing filter filters the difference signal spectrally across adjacent frequency bands.

20. The method of claim 13 wherein the smoothing filter is gated by a voice activity detector so as to update the long term difference signal only when speech is not detected.

21. The method of claim 13 further comprising producing a second noise reference signal using a third microphone signal, and combining the noise reference signals to obtain a combined noise reference signal which is used to produce the difference signal.

22. The method of claim 13 wherein the combining comprises selecting the maximum absolute real and imaginary FFT components per subband.

* * * * *